US011359967B2

(12) United States Patent
Cao et al.

(10) Patent No.: US 11,359,967 B2
(45) Date of Patent: Jun. 14, 2022

(54) METHOD FOR MEASURING ACTUAL TEMPERATURE OF FLAME BY USING ALL INFORMATION OF RADIATION SPECTRUM AND MEASUREMENT SYSTEM THEREOF

(71) Applicant: TIANJIN YITONG TRANSMISSION & DISTRIBUTION ELECTRIC TECHNOLOGY CO. LTD., Tianjin (CN)

(72) Inventors: Bolin Cao, Tianjin (CN); Chengzhang Tan, Tianjin (CN); Rui Cao, Tianjin (CN); Chenggang Liu, Tianjin (CN); Li Cao, Tianjin (CN); Changfang Chen, Tianjin (CN); Yao Li, Tianjin (CN); Changjian Dai, Tianjin (CN)

(73) Assignee: TIANJIN YITONG TRANSMISSION & DISTRIBUTION ELECTRIC TECHNOLOGY CO. LTD., Tianjin (CN)

( * ) Notice: Subject to any disclaimer, the term of this patent is extended or adjusted under 35 U.S.C. 154(b) by 0 days.

(21) Appl. No.: 15/306,493

(22) PCT Filed: Mar. 23, 2015

(86) PCT No.: PCT/CN2015/074899
§ 371 (c)(1),
(2) Date: Oct. 25, 2016

(87) PCT Pub. No.: WO2015/161727
PCT Pub. Date: Oct. 29, 2015

(65) Prior Publication Data
US 2017/0045398 A1    Feb. 16, 2017

(30) Foreign Application Priority Data
Apr. 25, 2014    (CN) .......................... 201410169861.2

(51) Int. Cl.
| *G01J 5/00* | (2022.01) |
| *G01J 5/60* | (2006.01) |
| *G01J 5/02* | (2022.01) |
| *G01J 5/80* | (2022.01) |

(52) U.S. Cl.
CPC ............... *G01J 5/0018* (2013.01); *G01J 5/00* (2013.01); *G01J 5/0096* (2013.01); *G01J 5/025* (2013.01); *G01J 5/601* (2013.01); *G01J 5/80* (2022.01)

(58) Field of Classification Search
CPC ........ G01J 5/0018; G01J 5/0091; G01J 5/025; G01J 5/00; G01J 5/601
See application file for complete search history.

(56) References Cited

U.S. PATENT DOCUMENTS

| 5,132,922 A | 7/1992 | Khan et al. |
| 5,265,036 A * | 11/1993 | Suarez-Gonzalez ........................ F01D 17/085 356/45 |
| 2010/0246631 A1 * | 9/2010 | Barlett ...................... G01J 5/53 374/2 |

FOREIGN PATENT DOCUMENTS

| CN | 1410709 A | 4/2003 |
| CN | 101000264 A | 7/2007 |
| CN | 101907492 A | 12/2010 |
| CN | 102374902 A | 3/2012 |
| CN | 103123281 A | 5/2013 |
| CN | 103644972 A | 3/2014 |
| EP | 0335224 A2 | 4/1989 |

OTHER PUBLICATIONS

Determination of the true temperature of emitted radiation bodies from generalized Wien's displacement law, 5 Pages, 1999.
(Continued)

*Primary Examiner* — Bryan Bui
(74) *Attorney, Agent, or Firm* — George G. Wang; Bei & Ocean

(57) ABSTRACT

The present invention discloses a method for measuring an actual temperature of a flame by using all information of a radiation spectrum and a measurement system thereof. The
(Continued)

method includes: conducting more theoretical data processing by using energy level structure correction, wherein all information of the radiation spectrum can be used; and by way of a keyboard input manner or a data transmission input manner, acquiring an energy level structure correction parameter, and finally acquiring a more accurate actual temperature value of a measured flame. The method effectively overcomes a defect that the true temperature of the flame can be obtained by only conducting radiance correction through data processing with great calculations when adpted multi-spectral temperature measurement method. In the existing multi-spectral temperature measurement method at present, only information of several monochromatic radiation capacities in the radiation spectrum can be used; and in the method, information of all the monochromatic radiation capacities, thousands of monochromatic radiation capacities in general, in the radiation spectrum can be used.

5 Claims, 10 Drawing Sheets

(56) References Cited

OTHER PUBLICATIONS

A Study on Measurement Method of Exhaust Flames Temperature for Solid Propellant Rocket Engine, 5 Pages, 2006.

\* cited by examiner

METHOD FOR MEASURING ACTUAL TEMPERATURE OF FLAME BY USING ALL INFORMATION OF RADIATION SPECTRUM AND MEASUREMENT SYSTEM THEREOF

FIELD OF THE INVENTION

The present invention relates to the radiation spectrum temperature measurement methods and equipment thereof in the technical field of instruments and meters, and in particular, to a method for measuring an actual temperature of a flame by using all information of a radiation spectrum and a measurement system thereof.

BACKGROUND OF THE INVENTION

Flame temperature measurement technology is a hot research topic at home and abroad at present. It has important significance and application value in the field of energy conservation and emission reduction, aerospace, development of strategic and tactical weapons, and so on. There are many methods for measuring the flame temperature, mainly including a contact method, an imaging method, a laser spectrum method, an acoustic method and a radiation method. From the perspective of the international practical temperature scale, no matter for the reproduction of temperature standards or actual measurement, in temperature zones higher than the silver freezing point (1234.0 K), the radiation temperature measurement method is the first-choice method. The radiation method is divided into an "emission-absorption spectroscopy method" and a "pyrometer method". The "emission-absorption spectroscopy method" has disadvantages of huge structure, expensive cost, complicate technique, and easy to destroy the component and the heat balance state of the measured flame. The disadvantage of the "pyrometer method" is that the true temperature of the flame can be known only after "radiance correction" is carried out. At present, the most effective method for acquiring the true temperature and "radiance" data of an object is the multi-spectral temperature measurement method, in which the "radiance correction" is conducted through data processing by using the radiation luminance information of the flame under multiple spectrums to acquire the true temperature of the flame.

According to the black body radiation theory, three kinds of optical temperatures are defined, which are: 1. radiation temperature, which is measured according to the "radiation total energy" of a black body; 2. color temperature, which is measured according to "energy distribution in the spectrum" of the black body; and 3. brightness temperature, which is measured according to the "radiation energy within a certain waveband" of the black body. For an ideal black body, the above mentioned optical temperatures are the same as the actual temperature; but for an actual object, the above mentioned optical temperatures are not the same as the actual temperature.

It is currently known that the most effective method for acquiring the true temperature and the "radiance" data is the "multi-spectral temperature measurement method", in which the "radiance correction" is conducted through data processing by using the radiation luminance information of the flame under multiple spectrums (there are only a few spectrums actually) to acquire the true temperature of the flame. Due to the "radiance correction" requires great calculations, and only several limited pieces of spectral information can be utilized, so the temperature measurement accuracy of this method is hard to further improve. The "multi-spectral temperature measurement method" belongs to a "color temperature" method for measuring according to the "energy distribution in the spectrum" of the black body.

SUMMARY OF THE INVENTION

The present invention provides a method for measuring an actual temperature of a flame by using all information of a radiation spectrum and a measurement system, which improves the temperature measurement accuracy and reduces the calculation complexity, as described in detail below:

A method for measuring an actual temperature of a flame by using all information of a radiation spectrum comprises the following steps:

(1) measuring a first digital distribution spectrum of emissive power, changing with a wavelength $\lambda$, of a to-be-measured object at an arbitrary known temperature by using a digital spectrometer in an actual temperature measurement system in a calibration state, and figuring out a peak wavelength $\lambda_m$;

(2) inputting the first digital distribution spectrum to a single chip or a PC installed with a first physical model for data processing, and carrying out curve fitting on the first digital distribution spectrum by using the least square method to acquire parameters $X(1)$ and $X(2)$ reflecting the energy level structure;

(3) acquiring a Wien's displacement law correction formula of the to-be-measured object, and inputting the Wien's displacement law correction formula to the single chip or the PC in the actual temperature measurement system as a second physical model;

(4) inputting the verified parameter $X(2)$ reflecting the energy level structure into the second physical model to calibrate the actual temperature measurement system;

(5) measuring a second digital distribution spectrum of the emissive power, changing with the wavelength $\lambda$, of the to-be-measured object at a to-be-measured temperature by using a spectrometer in the actual temperature measurement system in a temperature measurement state, and obtaining a specific data of the peak wavelength $\lambda_m$;

(6) inputting the peak wavelength $\lambda_m$ acquired in the step (5) into the PC or the single chip in the actual temperature measurement system in the temperature measurement state, and carrying out operation processing according to the second physical model to acquire a temperature value of the to-be-measured object; and (7) displaying the temperature value of the to-be-measured object through a display.

The first physical model is specifically:

a formula formed by adding two energy level structure correction parameters $X(1)$ and $X(2)$ to the Planck formula applicable to the ideal black body:

$$E(\lambda, T) = X(1)C_1\lambda^{-5}\left(e^{\frac{X(2)C_2}{\lambda T}} - 1\right)^{-1}$$

Wherein, $E(\lambda,T)$ represents the spectral radiant flux density emitted by a non-black body, and the unit is $\text{Wcm}^{-2}\cdot\mu\text{m}^{-1}$; $C_1=3.741844\times10^{-12}$ $\text{W}\cdot\text{cm}^{-2}$ is called a first radiation constant; $C_2=1.438832544$ $\text{cm}\cdot\text{K}$ is called a second radiation constant; $\lambda$ represents the radiation wavelength, and the unit is $\mu\text{m}$; $T$ represents any known fixed temperature of the to-be-measured object, and the unit is K; $X(1)$ and $X(2)$ represent the energy level structure parameters and are two undetermined parameters added to the Planck formula.

The second physical model is specifically as follows:

$$\lambda_m T = X(2) \times 2.898 \times 10^{-3} \text{ (m*K)}.$$

The actual temperature measurement system has calibration state and the temperature measurement state. Calibration is aimed at acquiring specific datas of the parameters X(1) and X(2) reflecting the energy level structure of the to-be-measured object; and temperature measurement is aimed at acquiring the temperature value of the to-be-measured object.

A measurement system for measuring an actual temperature of a flame by using all information of a radiation spectrum includes:

a digital spectrometer, which has two functional states of a correction state and a temperature measurement state; when in the calibration state, the digital spectrometer is used for measuring a first digital distribution spectrum of emissive power, changing with a wavelength $\lambda$, of a to-be-measured object at an arbitrary known temperature, and figuring out a peak wavelength $\lambda_m$; and when in the temperature measurement state, the digital spectrometer is used for measuring a second digital distribution spectrum of the emissive power, changing with the wavelength $\lambda$, of the to-be-measured object at a to-be-measured temperature T;

a first input device, used for inputting the first digital distribution spectrum to a first data processing device installed with a first physical model;

the first data processing device, used for carrying out curve fitting on the first digital distribution spectrum by using the least square method to acquire parameters X(1) and X(2) reflecting an energy level structure, and acquiring a Wien's displacement law correction formula of the to-be-measured object, wherein the Wien's displacement law correction formula is used as a second physical model;

a second input device, used for inputting the second physical model to a second data processing device;

a calibration device, used for inputting the verified parameter X(2) reflecting the energy level structure into the second physical model to calibrate the digital spectrometer;

a third input device, used for inputting the second digital distribution spectrum to the second data processing device;

the second data processing device, used for acquiring a specific data of the peak wavelength $\lambda_m$ from the second digital distribution spectrum, and carrying out operation processing according to the peak wavelength $\lambda_m$ and the second physical model to acquire a temperature value of the to-be-measured object; and a display device, used for displaying the temperature value of the to-be-measured object.

The digital spectrometer has the calibration state and the temperature measurement state. Calibration is aimed at acquiring specific data of the parameters X(1) and X(2) reflecting the energy level structure of the to-be-measured object; and temperature measurement is aimed at acquiring the temperature value of the to-be-measured object.

The technical solutions provided by the present invention have the following beneficial effects: in the existing "colorimetric method", due to the great calculation workload of radiance correction, generally only several limited "monochromatic radiation capacities" with single wavelength can be selected to carry out the data processing, and the artificial neural network technology is also used in some researches. According to the present invention, the Wien's displacement law only applicable to the ideal black body is transformed to the "generalized Wien's displacement law" applicable to a specific non-black body to-be-measured object by energy level structure correction. The theoretical degree is high, the calculation workload is small (only simple division is carried out during temperature measurement), and as many as thousands of "monochromatic radiation capacities" received by the spectrometer can all be applied to the data processing, and thus the precision is greatly improved. Furthermore, in addition to the advantage of strong anti-environmental interference ability of the conventional "color temperature method", the present invention further has the advantages of clear theory, simple calculation, high temperature measurement accuracy, and that the calibration procedure only needs to be conducted at one temperature point. All these advantages are achieved by the laws of nature. Therefore, the technical solutions and the instruments provided by the present invention can be expanded to the entire field of radiation temperature measurement.

DETAILED DESCRIPTION OF THE EMBODIMENTS

Figure 1:
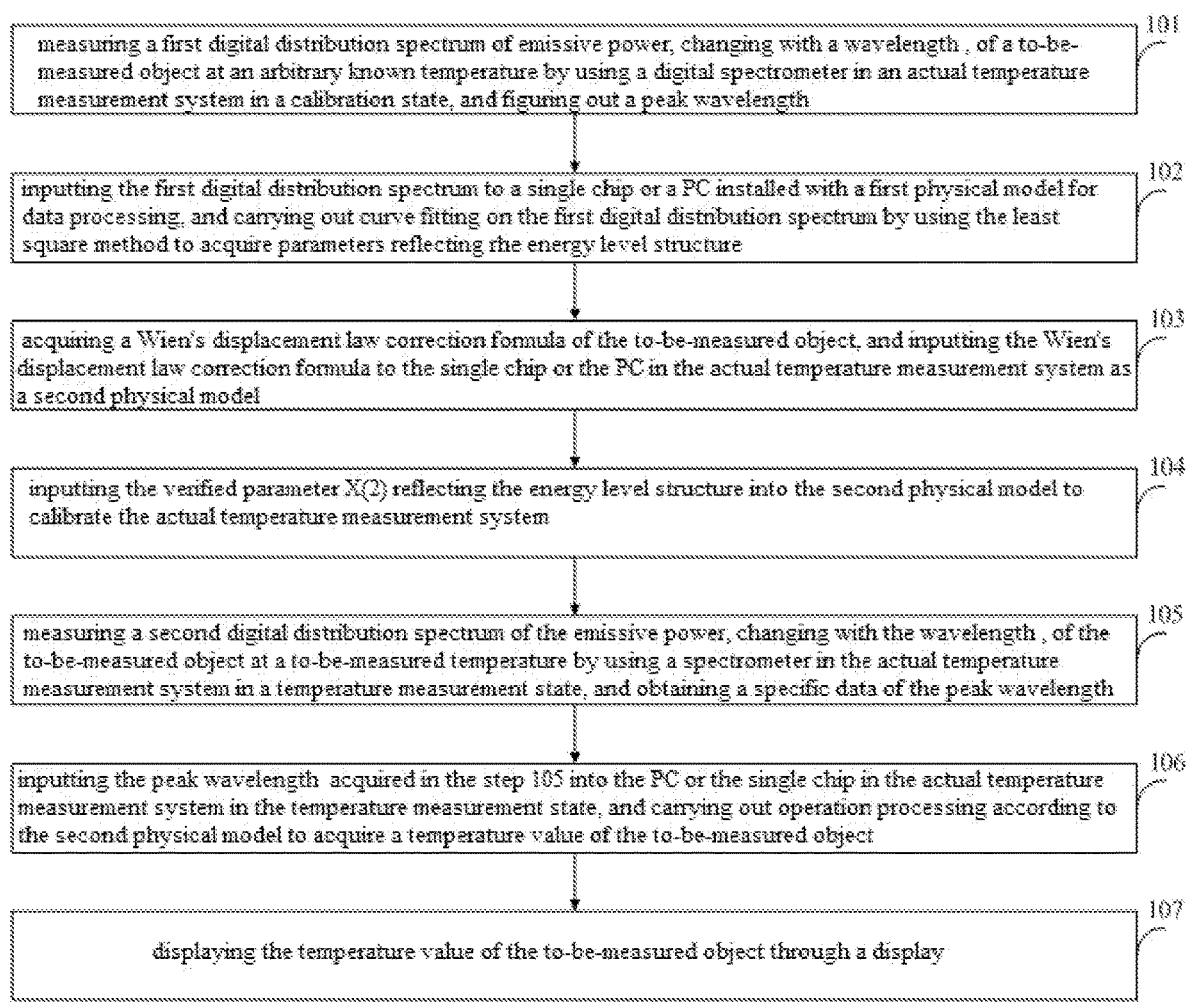
FIG. 1 is a flowchart of a method for measuring an actual temperature of a flame by using all information of a radiation spectrum.

In order that the objects, technical solutions and advantages of the present invention are clearer, the embodiments of the present invention will be further described below in detail.

The present invention is only applicable to the Wien's displacement law of the ideal black body, which is transformed to the "generalized Wien's displacement law" applicable to a specific non-black body to-be-measured object via "energy level structure correction". With respect to the non-black body to-be-measured object, the "color temperature" is the same as the actual temperature, and specific illustration is as follows:

The contents of the Wien's displacement law are as follows: on a distribution curve of emissive power $E(\lambda,T)$ of an ideal black body, with a wavelength $\lambda$, $E(\lambda,T)$ has a maximum value as a peak value, namely the maximum monochromatic emissive power. The wavelength corresponding to the maximum value is represented by $\lambda_m$, and is called a peak wavelength. For each temperature, there is a distribution curve of emissive power $E(\lambda,T)$ with a wavelength $\lambda$. With the increase of the temperature T, $\lambda_m$ moves towards the shortwave direction, and the relation therebetween is determined by the following formula:

$$\lambda_m T = 2.898 \times 10^{-3} \text{ (m*K)} \quad (1)$$

This is called the Wien's displacement law.

It should be noted that, a more accurate constant value is calculated by citing "a basic constant of physics", and the formula (1) should be rewritten to: $\lambda_m T=2.8979507428634305162188796020618\times10^{-3}$ (m*K).

After the peak wavelength $\lambda_m$ is measured by the spectrometer, the temperature T can be calculated by the formula (1). However, the temperature calculated in this way is only the color temperature of the to-be-measured object (i.e., a temperature assuming that the to-be-measured object is the black body), and is not the actual temperature of the to-be-measured object.

The following will specifically illustrate the methods of transforming the Wien's displacement law only applicable to the ideal black body to the "generalized Wien's displacement law" applicable to the specific non-black body to-be-measured object by "energy level structure correction", thus the method achieves the purpose that the "color temperature" of the non-black body to-be-measured object is the same as the actual temperature, as described in detail below:

101: measuring a first digital distribution spectrum of emissive power, changing with a wavelength $\lambda$, of a to-be-measured object at an arbitrary known temperature by using a digital spectrometer in an actual temperature measurement system in a calibration state, and figuring out a peak wavelength $\lambda_m$;

When it applies, the measurable wavelength range of the digital spectrometer should contain the peak wavelength $\lambda_m$; and whether the above requirements are satisfied can be estimated by using the formula (1). The arbitrary known temperature can be measured by a "standard instrument", for example, a standard photoelectric pyrometer, a standard pyrophotometer, or standard platinum rhodium 30-platinum rhodium 6.

102: Inputting the first digital distribution spectrum to a single chip or a PC installed with a first physical model to carry out data processing, and carrying out curve fitting on the first digital distribution spectrum by using the least square method to acquire parameters X(1) and X(2) reflecting an energy level structure;

the first physical model refers to a formula formed by adding two energy level structure correction parameters X(1) and X(2) to the Planck formula applicable to the ideal black body:

$$E(\lambda, T) = X(1) C_1 \lambda^{-5} \left( e^{\frac{X(2)C_2}{\lambda T}} - 1 \right)^{-1} \quad (2)$$

Wherein, $E(\lambda,T)$ represents the spectral radiant flux density emitted by a non-black body, and the unit is $\text{Wcm}^{-2} \cdot \mu\text{m}^{-1}$; $C_1=3.741844\times10^{-12}$ W·cm$^{-2}$ is called a first radiation constant; $C_2=1.438832544$ cm·K is called a second radiation constant; $\lambda$ represents the radiation wavelength, and the unit is μm; T represents any known fixed temperature of the to-be-measured object, and the unit is K; X(1) and X(2) represent the energy level structure parameters and are two undetermined parameters added to the Planck formula.

It should be noted that, more accurate constant values of $C_1$ and $C_2$ calculated by citing basic constants of physics should be:

$$C_1 = 3.7418439644240131737525825 \times 10^{-12} \text{ W·cm}^2$$

$$C_2 = 1.4388325438316932513026737224237 \text{ cm·K}$$

In order to improve the measurement accuracy, the above steps 101 to 102 can also be carried at a plurality of known temperature points, and then a plurality of acquired values X(2) are averaged.

103: Acquiring a Wien's displacement law correction formula of the to-be-measured non-black body, and inputting the Wien's displacement law correction formula to the single chip or the PC in the actual temperature measurement system as a second physical model;

the Wien's displacement law (i.e. formula 3) only applicable to the black body is rewritten to the Wien's displacement law correction formula applicable to the to-be-measured non-black body, namely a formula (4):

$$\lambda_m T = 2.898 \times 10^{-3} \text{ (m*K)} \quad (3)$$

$$\lambda_m T = X(2) \times 2.898 \times 10^{-3} \text{ (m*K)} \quad (4)$$

wherein the derivation process of the Wien's displacement law correction formula (4) is as follows:

$$X = \frac{X(2)C_2}{\lambda T}$$

is introduced into the formula (2), then $$dX = -\left(\frac{X(2)C_2}{\lambda^2 T}\right) d\lambda = -\left(\frac{TX^2}{X(2)C_2}\right) d\lambda$$

the formula (2) is changed into $$E(\lambda, T) = \frac{C_1 T^5 X^5}{C_2^5 (e^X - 1)}$$

In order to figure out the location of the maximum value in the above formula, a differential of the maximum value is calculated and set to 0.

$$\frac{dE(\lambda, T)}{dx} = \frac{C_1 T^5 \{(e^X - 1)5X^4 - X^5 e^X\}}{C_2^5 (e^X - 1)^2} = 0$$

Therefore, a condition satisfying the above formula is acquired as follows: $5e^X - Xe^X - 5 = 0$, the equation is solved to acquire $X_m = 4.965$, that is, $$X_m = \frac{X(2)C_2}{\lambda_m T} = 4.965$$

or $\lambda_m T = X(2) \times 1.44$ cm·K/$4.965 = X(2) \times 2.898 \times 10^{-3}$ (m*K), namely the formula (4).

104: Inputting the verified parameter $X(2)$ reflecting the energy level structure to the second physical model to calibrate the actual temperature measurement system;

wherein the verification of the parameter $X(2)$ reflecting the energy level structure is specifically as follows: the $\lambda_m$ acquired in the step 101 and the known temperature and the $X(2)$ acquired in the step 102 are substituted into the formula (4) to verify the correctness of the $X(2)$. When the error is relatively small, the verified parameter $X(2)$ reflecting the energy level structure is input into the second physical model to calibrate the actual temperature measurement system; otherwise, namely when the error is relatively large, returns to the step 101 to carry out the correction process again.

In addition, if the to-be-measured object is a transparent flame (that is the radiation-like or band-like spectrum), smoke particles need to be artificially added to the flame to change the same into a luminous flame (continuous radiation spectrum) when a spectral sample is collected.

105: Measuring a second digital distribution spectrum of the monochromatic emissive power $E(\lambda, T)$, changing with the wavelength $\lambda$, of the to-be-measured object at a to-be-measured temperature T by using a spectrometer in the actual temperature measurement system in a temperature measurement state, and acquiring a specific data of the peak wavelength $\lambda_m$;

wherein the peak wavelength $\lambda_m$ should be contained within the measurable wavelength range of the spectrograph to directly measure the specific data thereof; and whether the above requirements are satisfied can be estimated by using the formula (1).

106: Inputting the peak wavelength $\lambda_m$ acquired in the step 105 into the PC or the single chip in the actual temperature measurement system in the temperature measurement state, and carrying out operation processing according to the second physical model to acquire a temperature value of the to-be-measured object; and

107: Displaying the temperature value of the to-be-measured object through a display.

Wherein, the actual temperature measurement system has two functions of determining the parameters reflecting the energy level structure of the to-be-measured object and determining the temperature of the to-be-measured object.

Figure 2:
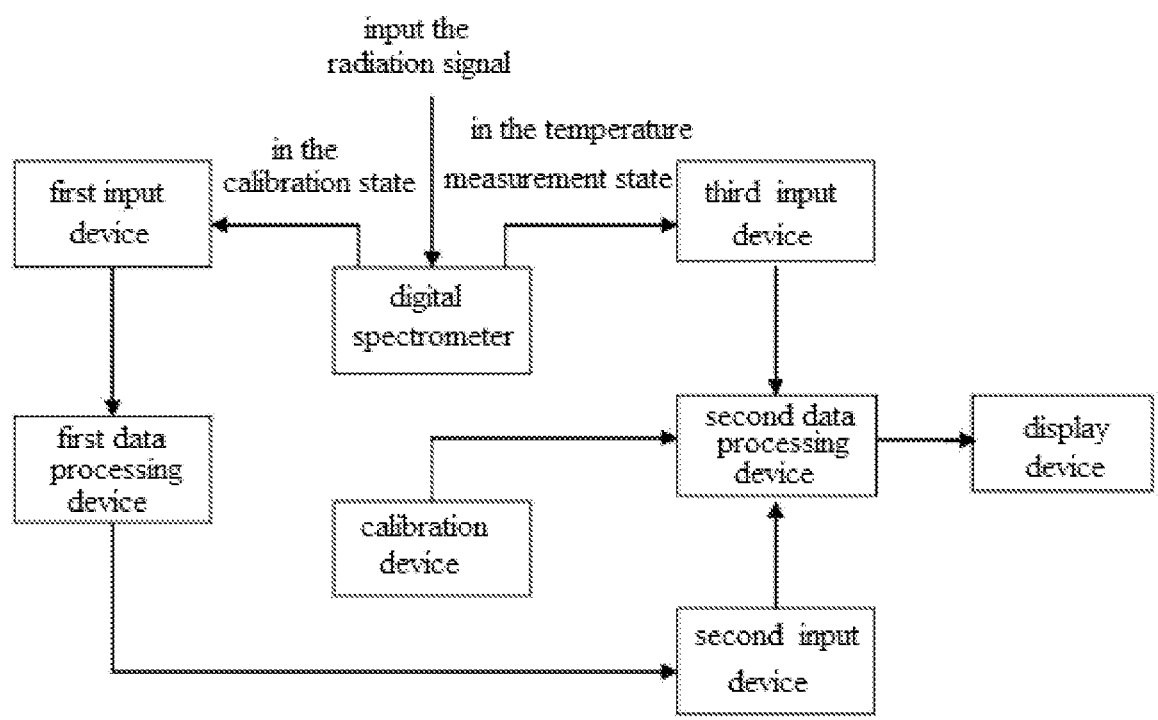
FIG. 2 is a structural schematic diagram of a measurement system for measuring an actual temperature of a flame by using all information of a radiation spectrum.
Figure 3:
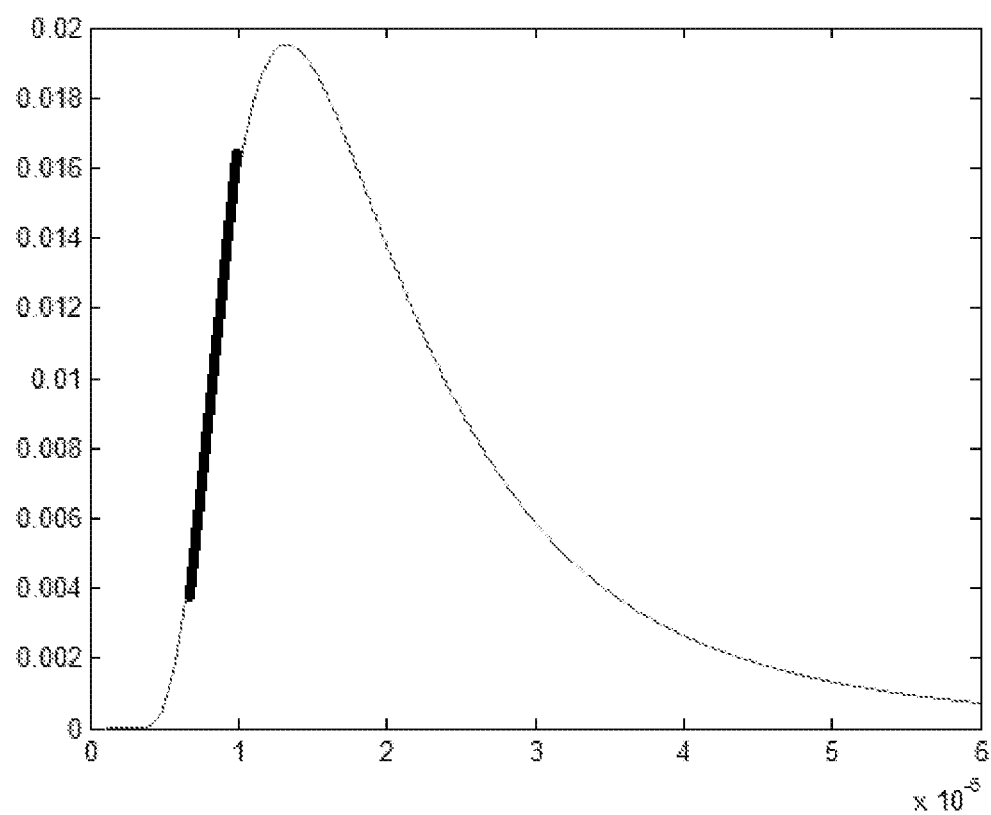
FIG. 3 is a schematic diagram of a distribution curve of emissive power $E(\lambda,T)$ with a wavelength $\lambda$, where $I_f(A)=$ 0.55 and X(1)=688.151507034063, when an ideal filament temperature of a diode is 1800K.
Figure 4:
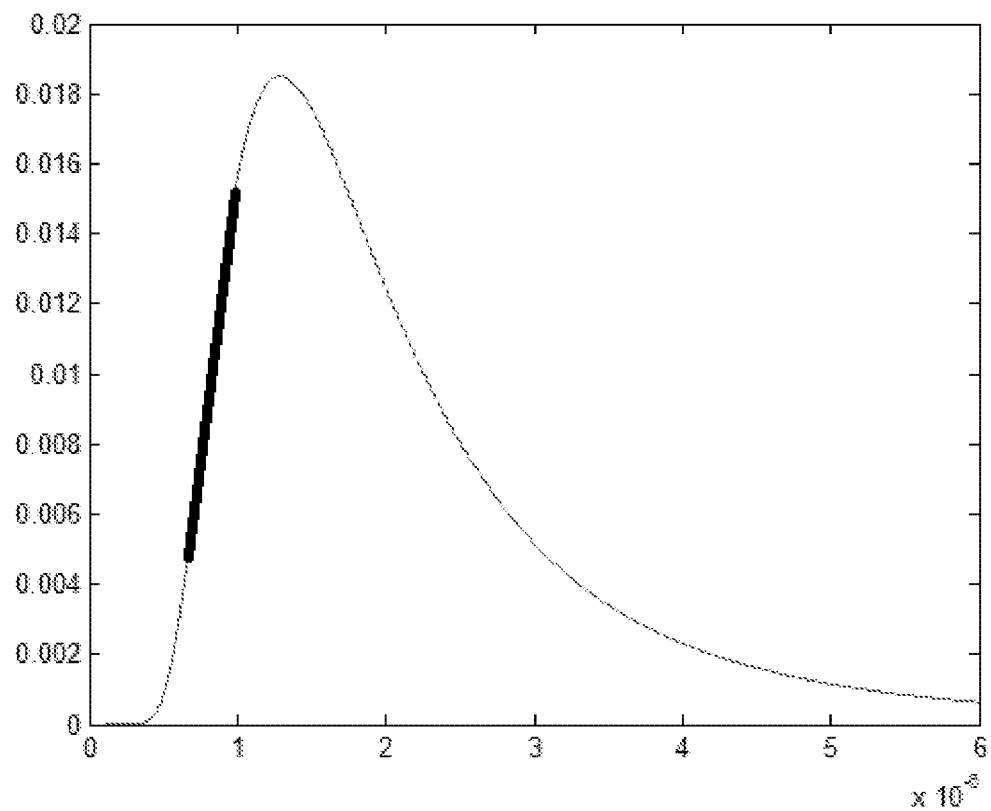
FIG. 4 is a schematic diagram of a distribution curve of emissive power $E(\lambda,T)$ with a wavelength $\lambda$, where $I_f(A)=$ 0.60 and X(1)=565.451265451300, when an ideal filament temperature of a diode is 1880K.
Figure 5:
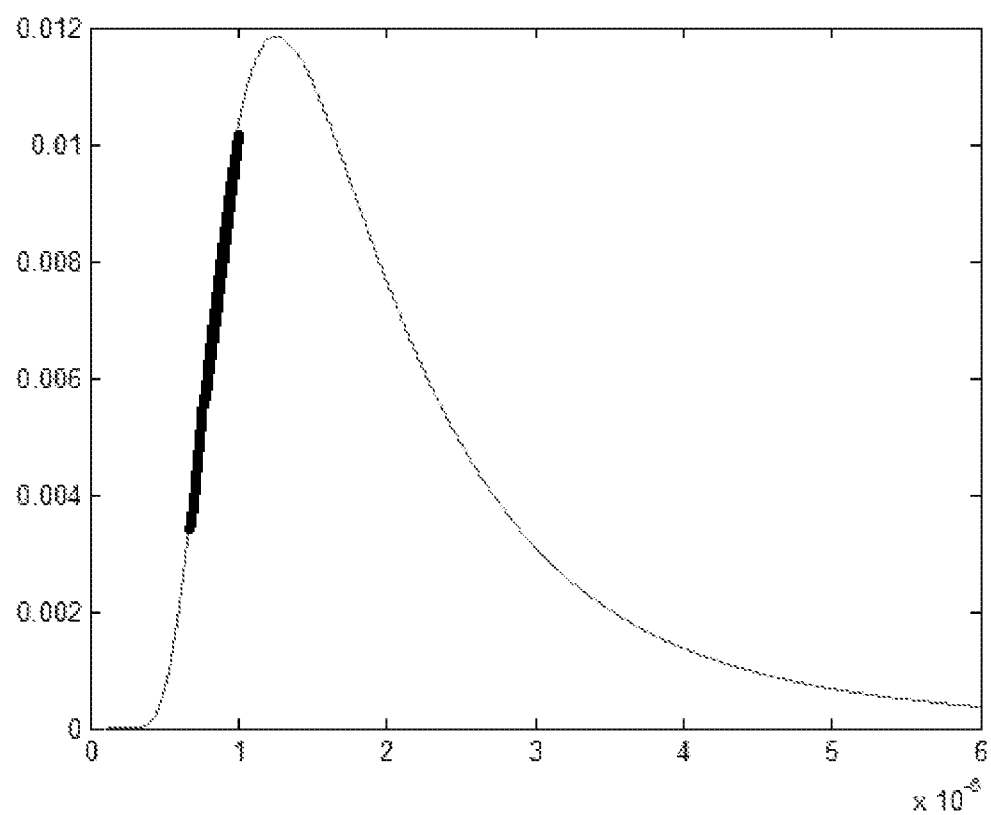
FIG. 5 is a schematic diagram of a distribution curve of emissive power $E(\lambda,T)$ with a wavelength $\lambda$, where $I_f(A)=$ 0.65 and X(1)=319.697031070087, when an ideal filament temperature of a diode is 1960K.
Figure 6:
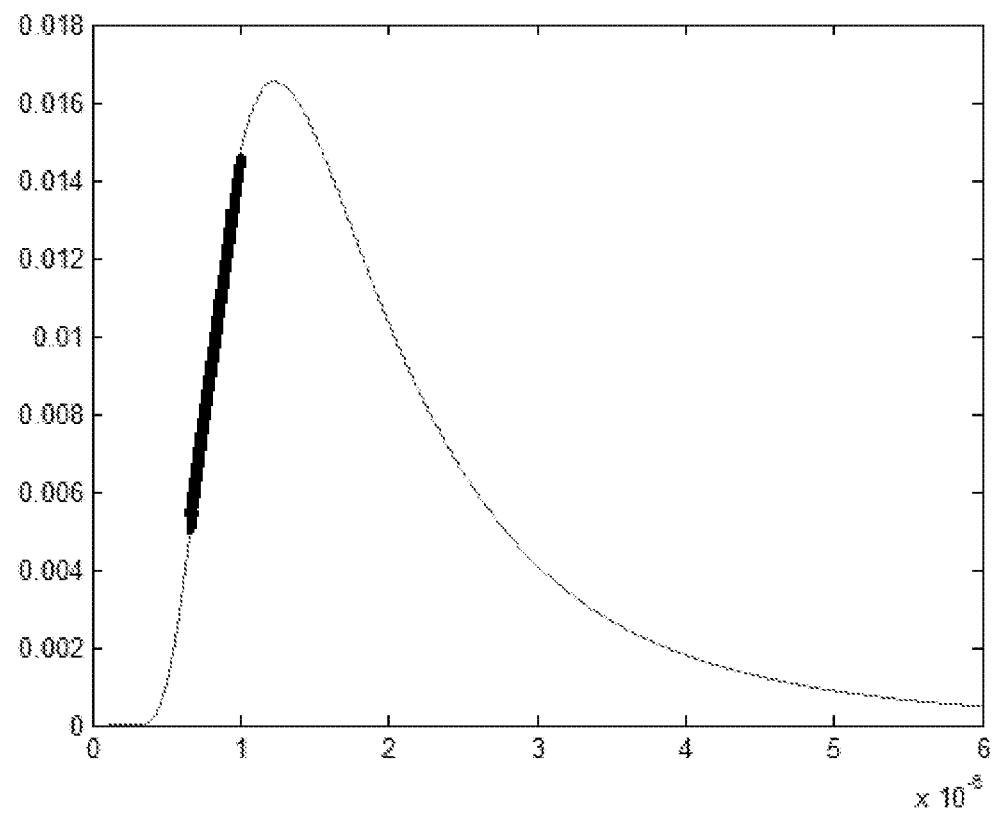
FIG. 6 is a schematic diagram of a distribution curve of emissive power $E(\lambda,T)$ with a wavelength $\lambda$, where $I_f(A)=$ 0.70 and X(1)=405.677545908357, when an ideal filament temperature of a diode is 2040K.
Figure 7:
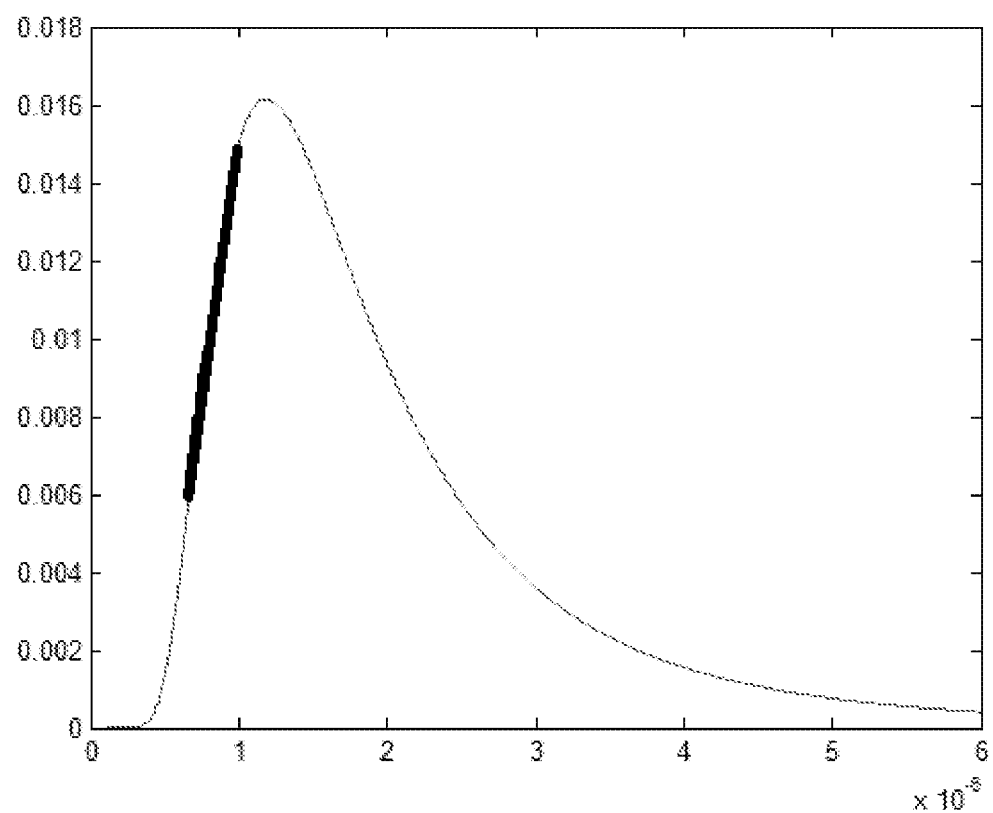
FIG. 7 is a schematic diagram of a distribution curve of emissive power $E(\lambda,T)$ with a wavelength $\lambda$, where $I_f(A)=$ 0.75 and X(1)=322.483340509147, when an ideal filament temperature of a diode is 2120K.
Figure 8:
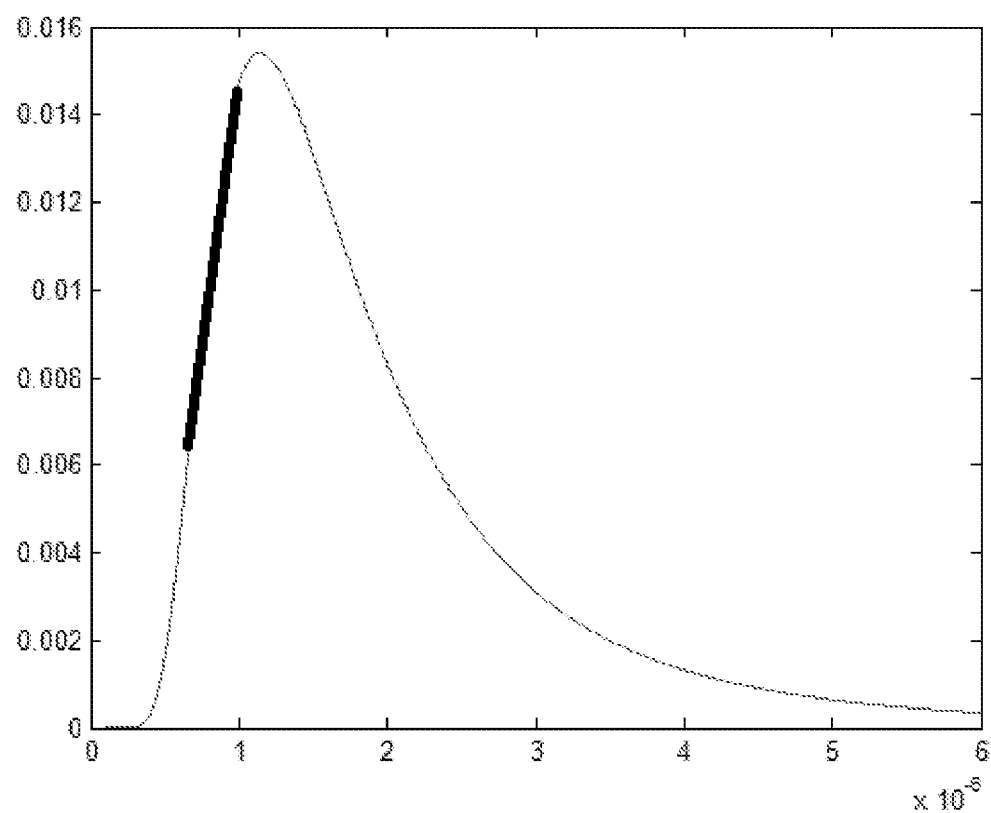
FIG. 8 is a schematic diagram of a distribution curve of emissive power $E(\lambda,T)$ with a wavelength $\lambda$, where $I_f(A)=$ 0.80 and X(1)=256.636032423250, when an ideal filament temperature of a diode is 2200K.
Figure 9:
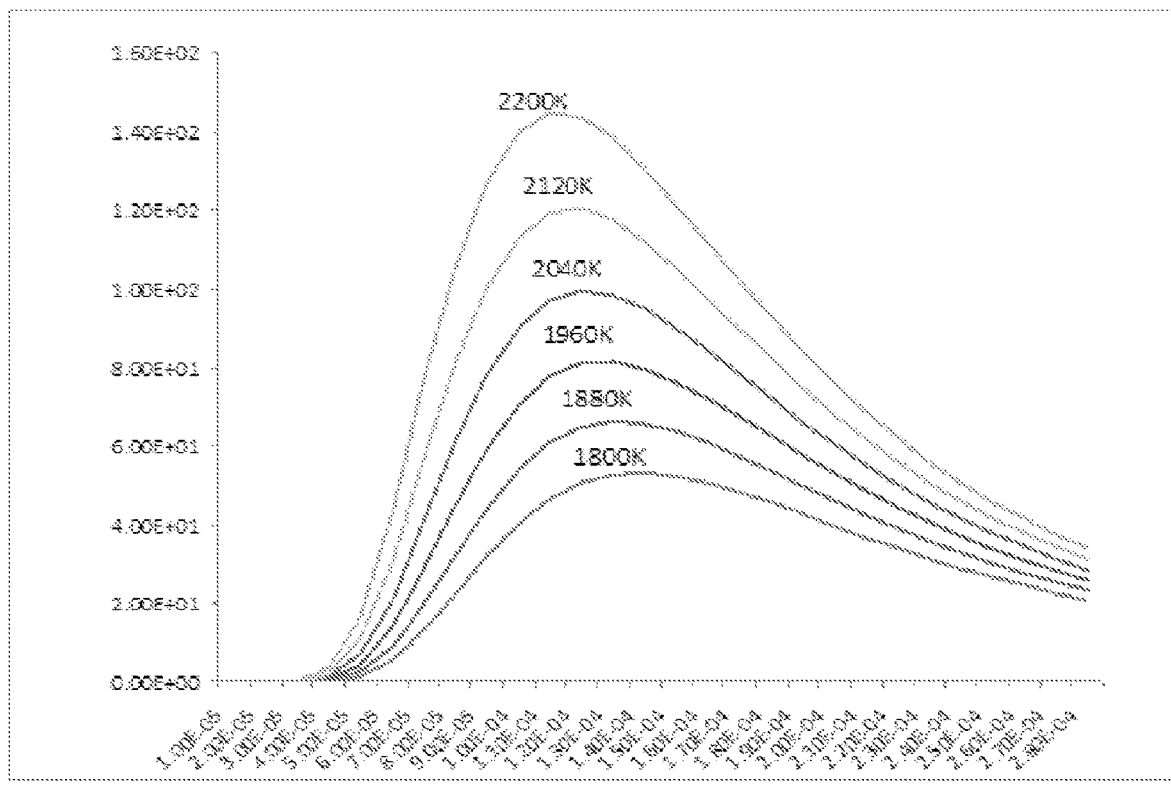
FIG. 9 shows movement of a peak wavelength $\lambda_m$ of a distribution curve of emissive power $E(\lambda,T)$ of an ideal diode filament temperature with a wavelength $\lambda$ towards a shortwave direction with the increase of a temperature T. The relation therebetween is determined by a "generalized Wien's displacement law", $\lambda_m T = X(2) \times 2.898 \times 10^{-3}$.

Referring to FIG. 2, a measurement system for measuring an actual temperature of a flame by using all information of a radiation spectrum includes:

a digital spectrometer, which has two functional states of calibration state and a temperature measurement state; when in the calibration state, the digital spectrometer is used for measuring a first digital distribution spectrum of emissive power, changing with a wavelength $\lambda$, of a to-be-measured object at an arbitrary known temperature, and figuring out a peak wavelength $\lambda_m$; and when in the temperature measurement state, the digital spectrometer is used for measuring a second digital distribution spectrum of the emissive power, changing with the wavelength $\lambda$, of the to-be-measured object at a to-be-measured temperature T;

a first input device, used for inputting the first digital distribution spectrum to a first data processing device installed with a first physical model;

the first data processing device, used for carrying out curve fitting on the first digital distribution spectrum by using the least square method to acquire parameters $X(1)$ and $X(2)$ reflecting an energy level structure, and acquiring a Wien's displacement law correction formula of the to-be-measured object, wherein the Wien's displacement law correction formula is used as a second physical model;

a second input device, used for inputting the second physical model to a second data processing device;

a calibration device, used for inputting the verified parameter $X(2)$ reflecting the energy level structure into the second physical model to calibrate the digital spectrometer;

a third input device, used for inputting the second digital distribution spectrum to the second data processing device;

the second data processing device, used for acquiring a specific data of the peak wavelength $\lambda_m$ from the second digital distribution spectrum, and carrying out operation processing according to the peak wavelength $\lambda_m$ and the second physical model to acquire a temperature value of the to-be-measured object; and a display device, used for displaying the temperature value of the to-be-measured object.

In the embodiments of the present invention, the above components are not limited, any devices capable of accomplishing the above functions can be adopted, for example, the first data processing device and the second data processing device can be single chips or PCs; the first input device, the second input device and the third input device can be USB interfaces or WIFI or other wireless transmission means; and the display device can be a display, etc.

As can be seen from the preferred embodiment, $X(2)$ and $\lambda_m T$ basically do not change with the temperature T, and the small changes thereof are caused by experimental errors. This result directly proves our theoretical expectations that: the functional form of the Planck formula derived from a black body model can be applied to any thermal radiation objects, and the differences of the thermal radiation objects can be described by the different parameters reflecting the energy level structure in the functional form. Therefore, in the black body radiation theory, all conclusions, including the Wien's displacement law, can be generalized to the rest thermal radiators. This is the theoretical and experimental basis of the present invention.

The embodiments fully reveals the true features of the laws of nature and exposes the defects of the radiance correction method. According to the modern quantum theory, the essence of heat (light) radiation is microscopic particle quantum transition. The historical experience indicates that, with respect to this problem involving an internal microscopic process of substance, the classical theory (the theoretical basis of the radiance correction method) has become powerless, and the problem can only be solved by the modern quantum theory (the theoretical basis of the present invention).

The non-black body thermal radiation source used in the preferred embodiment is an ideal diode filament, particularly is a 0.075 mm elongated tungsten wire that can be approximately deemed as an infinitely long straight wire. The radiance of the tungsten wire is 0.44, and is apparently belong to the non-black body. The filament temperature of the ideal diode can be controlled by the current. Manufacturers have previously designed and measured the relation between the current and the temperature of the ideal diode filament, as shown in Table 1. The temperatures listed in Table 1 are the actual temperatures of the filament.

TABLE 1

Relation between the current and the temperature of the ideal diode filament

| $I_f$ (A) | 0.50 | 0.55 | 0.60 | 0.65 | 0.70 | 0.75 | 0.80 |
|---|---|---|---|---|---|---|---|
| T (*10³ k) | 1.72 | 1.80 | 1.88 | 1.96 | 2.04 | 2.12 | 2.20 |

TABLE 2

Experimental data within a temperature measurement range of 1800 K to 2000 K

| Item | 0.55 A | 0.60 A | 0.65 A |
|---|---|---|---|
| x (1) | 688.151507034063 | 565.451265451300 | 319.697031070087 |
| x (2) | 0.824059629052930 | 0.836550647356216 | 0.850519389918353 |
| $\lambda_m$ (m) | 1.32755000000000*10⁻⁶ | 1.29030000000000*10⁻⁶ | 1.25830000000000*10⁻⁶ |
| $\lambda_m$ T | 2389.59*10⁻⁶ | 2425.764*10⁻⁶ | 2466.268*10⁻⁶ |

TABLE 3

Experimental data within a temperature measurement range of 2000 K to 2200 K

| Item | 0.70 A | 0.75 A | 0.80 A |
|---|---|---|---|
| x (1) | 405.677545908357 | 322.483340509147 | 256.636032423250 |
| x (2) | 0.868675778740922 | 0.866236869954822 | 0.866951937485245 |
| $\lambda_m$ (m) | 1.23480000000000*10⁻⁶ | 1.18485000000000*10⁻⁶ | 1.14270000000000*10⁻⁶ |
| $\lambda_m$ T | 2518.992*10⁻⁶ | 2511.882*10⁻⁶ | 2513.94*10⁻⁶ |

Due to the limitation of the conditions, in the experimental data provided at present, the $\lambda_m$ value is extrapolated from actually measured data, and the error is considerably large. However, if the temperature is measured in two levels according to above data, the temperature measurement accuracy can also be controlled within the currently specified allowable error range of the work measuring instruments. A comparable instrument is a colorimetric thermometer, and the allowable error range thereof is 0.01 to 0.025

The calculation processing of the provided experimental data is as follows:

the first level temperature measurement ranges from 1800K to 2000K.

The average value of $\lambda_m$ T is 2427.191*10⁻⁶ (m*K), so the adopted formula is of $\lambda_m$ T=2427.191*10⁻⁶ (m*K); then calculation is carried out to acquire:

T(0.55A)=2427.191*10⁻⁶/1.32755*10⁻⁶=1828(K); and an absolute error is 1828−1800=28(K). The relative error is 28/1800=0.016.

T(0.60A)=2427.191*10⁻⁶/1.2903*10⁻⁶=1881(K); and the absolute error is 1881−1880=1(K). The relative error is 1/1880=5.3*10⁻⁴=0.00053.

T(0.65A)=2427.191*10⁻⁶/1.2583*10⁻⁶=1929(K); and the absolute error is 1929−1960=−31(K). The relative error is −31/1960=0.0158.

The maximum absolute error is 31K; and the relative error is 0.016, which is within the currently specified allowable error range of the work measuring instruments.

The second level temperature measurement ranges from 2000K to 2200K.

The average value of $\lambda_m$ T is 2514.938*10⁻⁶ (m*K), so the adopted formula is of $\lambda_m$ T=2514.938*10⁻⁶ (m*K); then calculation is carried out to acquire:

T(0.70A)=2514.938*10⁻⁶/1.2348*10⁻⁶=2037(K); and the absolute error is 2037−2040=−3(K). The relative error is 3/1960=0.0015.

T(0.75A)=2514.938*10⁻⁶/1.18485*10⁻⁶=2123(K); and the absolute error is 2123−2120=3(K). The relative error is 3/2120=0.0014.

T(0.80A)=2514.938*10⁻⁶/1.1427*10⁻⁶=2201(K); and the absolute error is 2201−2200=1(K). The relative error is 1/2200=0.0005.

The maximum absolute error is 3K; and the relative error is 0.0015, which is within the currently specified allowable error range (from 2K to 15K) of the work measuring instruments.

In the above experimental results, the error of the first level is larger; and the error of the second level is relatively smaller. The reason is that the spectrometer used in the experiment can only measure light with wavelengths less than 1 micron. The first level temperature is lower, and the peak wavelength is larger and is of 1.2583–1.32755 microns. Therefore, due to the experimental data has less actually measured data, and more extrapolated data, so that a result error is larger. The second level temperature is higher, and the peak wavelength is smaller and is of 1.1427–1.2348 microns. Therefore, the experimental data has more actually measured data and less extrapolated data, so that the result error is smaller.

It can be predicted that, if it is specified that "the requirement on the digital spectrometer is that its measurable wavelength range should contain the peak wavelength $\lambda_m$", then the temperature measurement accuracy of the measurement system for measuring the actual temperature of the flame by using all information of the radiation spectrum will be improved, which can be completely within the currently specified allowable error range (from 2K to 15K) of the work measuring instruments.

It should be noted that if no level division is adopted, the adopted formula should be:

$$\lambda_m T = X(2) * b = 0.8550 * 2.897 * 10^{-3} = 2.455 * 10^{-3} \ (m*K)$$

FIGS. 3 to 9 show the fitted curves of the experimental data, the thick line is a measured spectral line, and the thin line is the fitted curve. The unit of an abscissa axis is m. It can be seen from the above figures that the present invention achieves a better experimental effect, and the experiment verifies the feasibility of the present invention.

Figure 10:
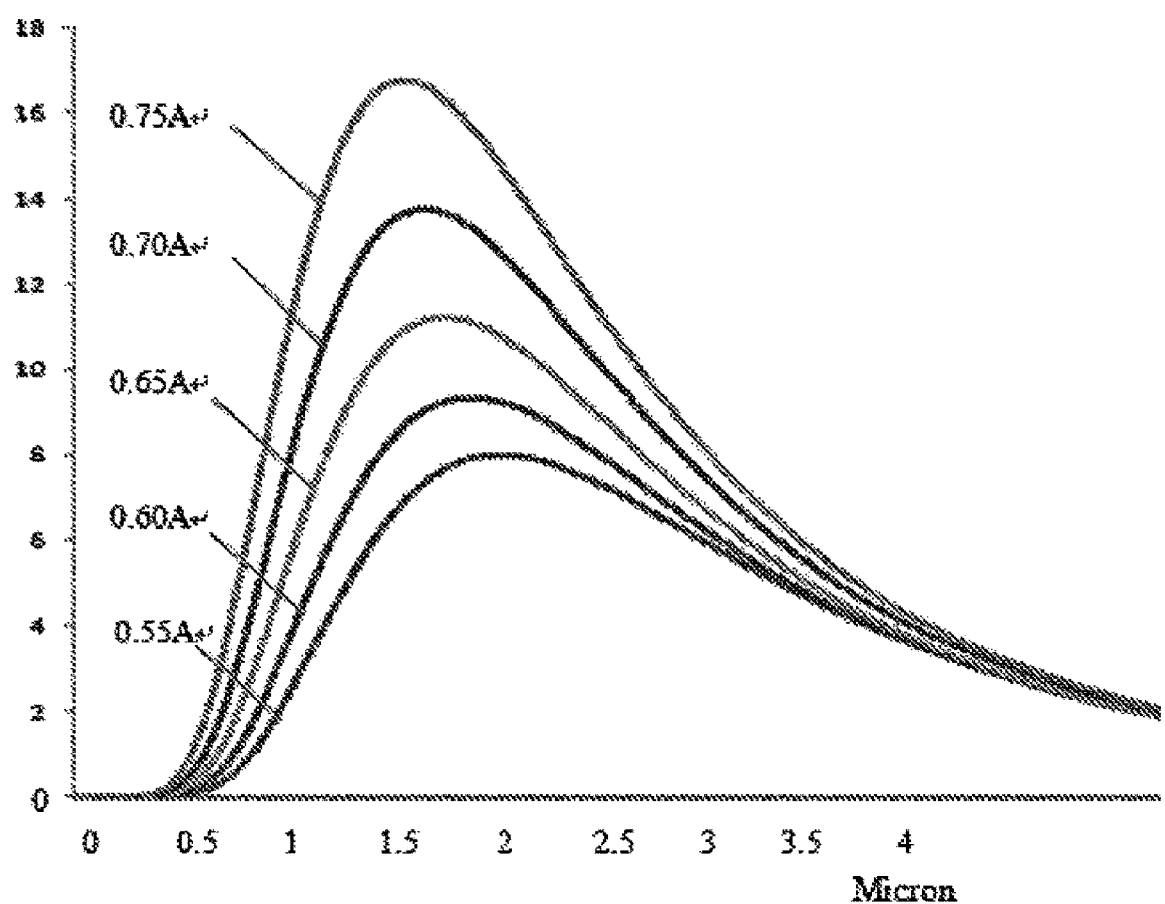
FIG. 10 is the fitted curves of measured emission spectrum of a hot tungsten wire at different currents.

In addition, according to emission spectrum of a hot tungsten wire at different current, the result is measured by an infrared scanning spectrometer (after the sensitivity of a photosensitive element is corrected), and the curves are shown in FIG. 10. Although the precision is not high, the trend is completely correct.

With respect to the model number of the devices in the embodiments of the present invention, unless otherwise stated, the model numbers of other devices are not limited, as long as the devices can accomplish the above functions.

Those skilled in the art can understand that the drawings are merely schematic diagrams of a preferred embodiment, the sequence numbers of the foregoing embodiments of the present invention are only for the purpose of description, and do not represent the superiority levels of the embodiments.

The foregoing descriptions are merely preferred embodiments of the present invention, rather than limiting the present invention. Any modifications, equivalent substitutions, improvements and the like made within the temperature measurement range of radiation spectral distribution shall all fall into the protection scope of the present invention.

What is claimed is:

1. A method for measuring an actual temperature of a flame by using all information of a radiation spectrum, comprising the following steps:
    (1) measuring a first digital distribution spectrum of emissive power, changing with a wavelength $\lambda$, of a to-be-measured object at an arbitrary known temperature by using a digital spectrometer in an actual temperature measurement system in a calibration state, and figuring out a peak wavelength $\lambda_m$;
    (2) inputting the first digital distribution spectrum to a single chip or a PC installed with a first physical model for data processing, and carrying out curve fitting on the first digital distribution spectrum by using the least square method to acquire parameters $X(1)$ and $X(2)$ reflecting the energy level structure;
    (3) acquiring a Wien's displacement law correction formula of the to-be-measured object, and inputting the Wien's displacement law correction formula to the single chip or the PC in the actual temperature measurement system as a second physical model;
    (4) inputting the verified parameter $X(2)$ reflecting the energy level structure into the second physical model to calibrate the actual temperature measurement system;
    (5) measuring a second digital distribution spectrum of the emissive power, changing with the wavelength $\lambda$, of the to-be-measured object at a to-be-measured temperature by using a digital spectrometer in the actual temperature measurement system in a temperature measurement state, and obtaining a specific data of the peak wavelength $\lambda_m$;
    (6) inputting the peak wavelength $\lambda_m$ acquired in the step (5) into the PC or the single chip in the actual temperature measurement system in the temperature measurement state, and carrying out operation processing according to the second physical model to acquire a temperature value of the to-be-measured object; and
    (7) displaying the temperature value of the to-be-measured object through a display;
    wherein the first physical model is specifically:
    a formula formed by adding two energy level structure correction parameters $X(1)$ and $X(2)$ to the Planck formula applicable to the ideal black body:

$$E(\lambda, T) = X(1)C_1\lambda^{-5}\left(e^{\frac{X(2)C_2}{\lambda T}} - 1\right)^{-1}$$

wherein, $E(\lambda,T)$ represents the spectral radiant flux density emitted by a non-black body, and the unit is $\text{Wcm}^{-2}\cdot\mu\text{m}^{-1}$; $C_1=3.741844\times10^{-12}$ $\text{W}\cdot\text{cm}^{-2}$ is called a first radiation constant; $C_2=1.438832544$ cm·K is called a second radiation constant; $\lambda$ represents the radiation wavelength, and the unit is $\mu$m; T represents any known fixed temperature of the to-be-measured object, and the unit is K; $X(1)$ and $X(2)$ represent the energy level structure parameters and are two undetermined parameters added to the Planck formula.

2. The method for measuring an actual temperature of a flame by using all information of a radiation spectrum according to claim 1, wherein the second physical model is specifically as follows: $\lambda_m T = X(2)\times 2.898\times10^{-3}$ (m*K).

3. The method for measuring an actual temperature of a flame by using all information of a radiation spectrum according to claim 1, wherein the actual temperature measurement system has calibration state and the temperature measurement state; calibration is aimed at acquiring specific data of the parameters $X(1)$ and $X(2)$ reflecting the energy level structure of the to-be-measured object; and temperature measurement is aimed at acquiring the temperature value of the to-be-measured object.

4. A measurement system for measuring an actual temperature of a flame by using all information of a radiation spectrum, comprising:
    a digital spectrometer, which has two functional states of a correction state and a temperature measurement state; when in the calibration state, the digital spectrometer is used for measuring a first digital distribution spectrum of emissive power, changing with a wavelength $\lambda$, of a to-be-measured object at an arbitrary known temperature, and figuring out a peak wavelength $\lambda_m$; and when in the temperature measurement state, the digital spectrometer is used for measuring a second digital distribution spectrum of the emissive power, changing with the wavelength $\lambda$, of the to-be-measured object at a to-be-measured temperature T;
    a first input device, used for inputting the first digital distribution spectrum to a first data processing device installed with a first physical model;
    a first data processing device, used for carrying out curve fitting on the first digital distribution spectrum by using the least square method to acquire parameters $X(1)$ and $X(2)$ reflecting an energy level structure, and acquiring a Wien's displacement law correction formula of the to-be-measured object, wherein the Wien's displacement law correction formula is used as a second physical model;
    a second input device, used for inputting the second physical model to a second data processing device;
    a calibration device, used for inputting the verified parameter $X(2)$ reflecting the energy level structure into the second physical model to calibrate the digital spectrometer;
    a third input device, used for inputting the second digital distribution spectrum into the second data processing device;
    the second data processing device, used for acquiring a specific data of the peak wavelength $\lambda_m$ from the second digital distribution spectrum, and carrying out operation processing according to the peak wavelength $\lambda_m$ and the second physical model to acquire a temperature value of the to-be-measured object; and a display device, used for displaying the temperature value of the to-be-measured object;

wherein the first physical model is specifically:

a formula formed by adding two energy level structure correction parameters $X(1)$ and $X(2)$ to the Planck formula applicable to the ideal black body:

$$E(\lambda, T) = X(1)C_1\lambda^{-5}\left(e^{\frac{X(2)C_2}{\lambda T^2}} - 1\right)^{-1}$$

wherein, $E(\lambda,T)$ represents the spectral radiant flux density emitted by a non-black body, and the unit is $Wcm^{-2}\cdot\mu m^{-1}$; $C_1=3.741844\times10^{-12}$ $W\cdot cm^{-2}$ is called a first radiation constant; $C_2=1.438832544$ cm·K is called a second radiation constant; $\lambda$ represents the radiation wavelength, and the unit is $\mu m$; T represents any known fixed temperature of the to-be-measured object, and the unit is K; $X(1)$ and $X(2)$ represent the energy level structure parameters and are two undetermined parameters added to the Planck formula.

5. The measurement system for measuring an actual temperature of a flame by using all information of a radiation spectrum according to claim 4, wherein the digital spectrometer has the calibration state and the temperature measurement state; calibration is aimed at acquiring specific data of the parameters $X(1)$ and $X(2)$ reflecting the energy level structure of the to-be-measured object; and temperature measurement is aimed at acquiring the temperature value of the to-be-measured object.

\* \* \* \* \*